United States Patent
Gibbs

(10) Patent No.: US 7,549,680 B2
(45) Date of Patent: Jun. 23, 2009

(54) FLUID CONNECTION ASSEMBLY

(75) Inventor: Roderick Joseph Gibbs, Rugeley (GB)

(73) Assignee: Bristan Ltd., Staffordshire (GB)

( * ) Notice: Subject to any disclaimer, the term of this patent is extended or adjusted under 35 U.S.C. 154(b) by 0 days.

(21) Appl. No.: 10/521,921

(22) PCT Filed: May 2, 2003

(86) PCT No.: PCT/GB03/01928

§ 371 (c)(1),
(2), (4) Date: Aug. 25, 2005

(87) PCT Pub. No.: WO2004/009915

PCT Pub. Date: Jan. 29, 2004

(65) Prior Publication Data

US 2006/0152002 A1    Jul. 13, 2006

(30) Foreign Application Priority Data

Jul. 20, 2002    (GB) .............................. 0216898.7

(51) Int. Cl.
*F16L 19/00* (2006.01)
(52) U.S. Cl. .................... 285/354; 285/8; 285/219; 285/353; 285/384; 285/386
(58) Field of Classification Search ............ 285/8, 285/136.1, 139.2, 139.3, 141.1, 219, 354, 285/386, 353, 384, 387–388
See application file for complete search history.

(56) References Cited

U.S. PATENT DOCUMENTS

| 1,502,154 | A |   | 7/1924  | Mueller et al. |
| 1,820,656 | A | * | 8/1931  | Ford .............................. 285/31 |
| 2,726,101 | A | * | 12/1955 | Peterson ....................... 285/52 |
| 3,136,570 | A | * | 6/1964  | Lee .............................. 285/193 |
| 4,660,868 | A | * | 4/1987  | Totani ......................... 285/354 |
| 4,770,446 | A | * | 9/1988  | Keller ...................... 285/141.1 |
| 4,900,068 | A | * | 2/1990  | Law ......................... 285/139.2 |
| 5,382,057 | A | * | 1/1995  | Richter ........................ 285/39 |
| 6,192,529 | B1 |  | 2/2001  | Jones et al. |
| 6,378,912 | B1 | * | 4/2002 | Condon et al. .............. 285/220 |
| 6,460,432 | B1 | * | 10/2002 | Julian et al. ............... 81/125.1 |

FOREIGN PATENT DOCUMENTS

| DE | 38 07 846  | 9/1989 |
| DE | 195 20 905 | 8/1996 |
| WO | WO 92 11484 | 7/1992 |

* cited by examiner

*Primary Examiner*—Aaron M Dunwoody
*Assistant Examiner*—Fannie Kee
(74) *Attorney, Agent, or Firm*—Niray D. Parikh; Edgar A. Zarins

(57) ABSTRACT

A fluid connection assembly for connection to a fluid supply member that extends through a panel from a rear to a front surface of the panel includes a connection member that is engageable with the fluid supply member at the front surface of the panel. A connector is operable from in front of the panel to connect the fluid supply member to the outlet member in a fluid-tight manner. The connection member may be a shower outlet elbow for connection of a shower hose.

10 Claims, 2 Drawing Sheets

FLUID CONNECTION ASSEMBLY

REFERENCE TO RELATED APPLICATIONS

This application claims is a continuation-in-part of PCT Application PCT/GB2003/001928 filed on May 2, 2003, which claims priority to United Kingdom Patent Application GB0216898.7 filed on Jul. 20, 2002.

BACKGROUND OF INVENTION

The invention relates to a fluid connection assembly. The invention has been devised particularly but not exclusively in relation to a fluid outlet assembly intended for connection of a flexible shower hose, to lead to a shower head.

It is usual in shower installations, e.g. in domestic bath/shower rooms, to dispose fixed pipework, by which water is conveyed to the shower, behind a concealing panel with only the control(s) visible at the front surface of the panel. Such pipework may comprise hot and cold water supply pipes leading to a mixer valve controlling the shower and a single pipe leading from the mixer valve to the outlet assembly, which pipe usually protrudes through the panel. The outlet assembly normally comprises an outlet elbow, which connects to the supply pipe by a compression fitting. However, the compression fitting is usually disposed within a space behind the panel and access to the space is needed in order to enable secure connection of the outlet elbow to the supply pipe.

One problem with such an arrangement is that the requirement for such access is inconvenient, both during first installation of a shower and particularly if for any reason the outlet elbow needs servicing or subsequent replacement. A part of the panel may have to be removed to enable access to the compression fitting, which is particularly inconvenient if there are tiles covering the panel. The same difficulties can be encountered in situations other than shower installations.

It is therefore an object of the present invention to provide a fluid connection assembly which overcomes the aforementioned installation problems.

SUMMARY OF THE INVENTION

According to the present invention, there is provided a fluid connection assembly for connection to a fluid supply member extending through a panel from a rear to a front surface of the panel. The fluid connection assembly includes a connection member engageable with the fluid supply member at the front surface of the panel and a connection means operable from in front of the panel to connect the fluid supply member to the connection member in a fluid-tight manner.

The assembly includes a support member adapted to lie against the front surface of the panel. The connection means is a compression fitting and includes a sealing element deformable to establish a seal between the fluid supply member and the connection member. There may be a screw-threaded element adapted to engage with a complementary threaded portion of the connection member. The screw-threaded element may be held captive by a formation on the support member. There may also be provided a cover member adapted to engage with the assembly to conceal the assembly therebeneath. The cover member may engage with the assembly by a snap-fit with the assembly. The connection member may have a portion adapted to connect to a flexible shower hose. The connection member may be an outlet elbow.

BRIEF DESCRIPTION OF THE DRAWINGS

The invention will now be described by way of example with reference to the accompanying drawings, of which.

DETAILED DESCRIPTION OF THE EMBODIMENTS

Figure 1:
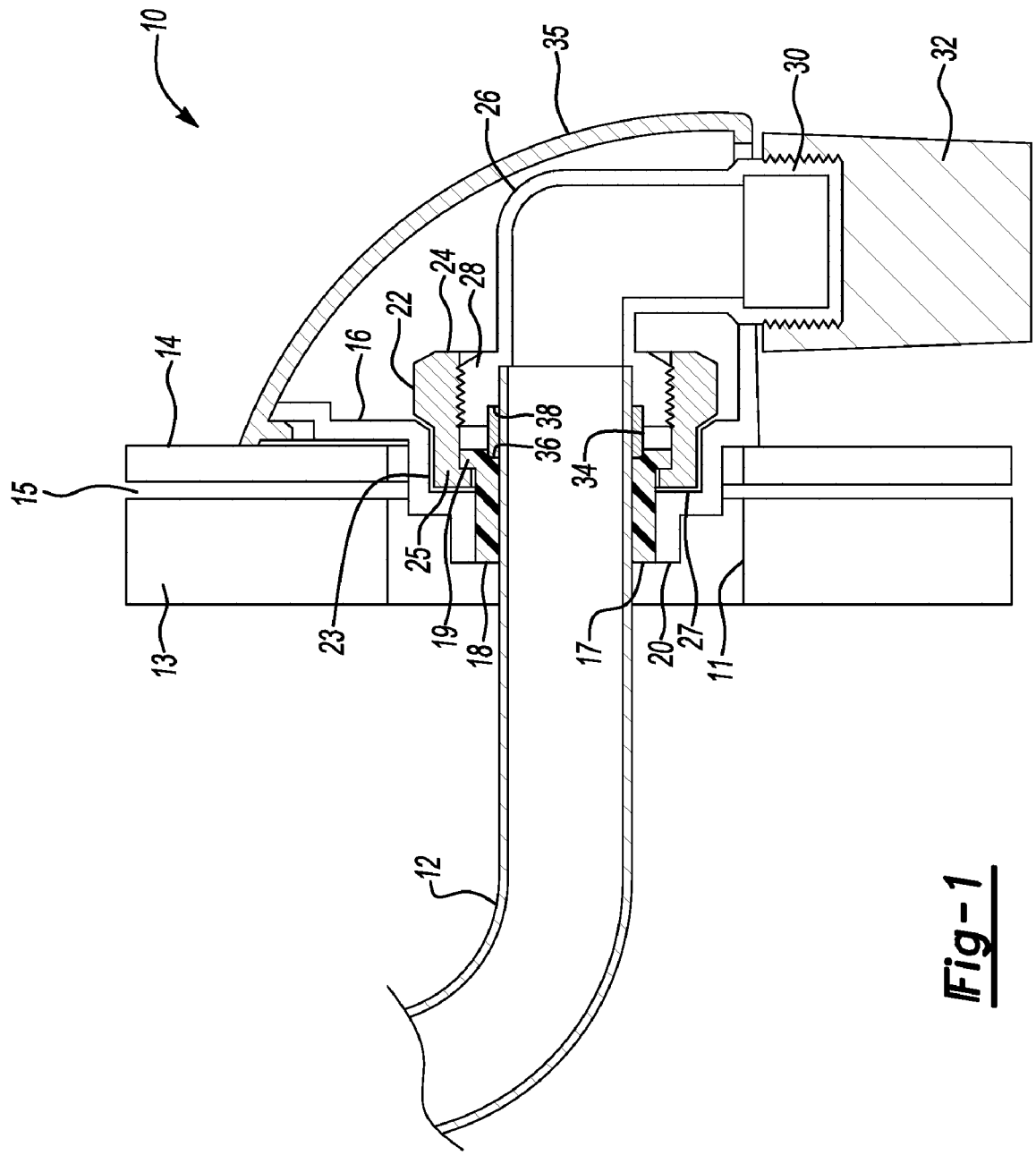
FIG. 1 is a side cross-sectional view of a first embodiment of fluid connection assembly in accordance with the invention.

Referring firstly to FIG. 1 of the drawings, there is shown a first embodiment of fluid connection assembly 10 in accordance with the present invention. There is a fluid supply member in the form of a pipe 12, which extends from, for example, a shower mixer valve (not shown). The pipe 12 passes through an aperture 11 in a panel 13, the panel 13 having a covering in the form of, for example, a tiled surface 14 bonded to the front surface of the panel 13 by an adhesive 15. Lying against the tiled surface 14, and reaching into the aperture 11, is a support member in the form of a support plate 16, e.g. of a plastics material. The support plate 16 has a cylindrical recess 23 ending in a radial face 27, followed by a concentric sleeve 20 with an aperture 17. Fixed within the sleeve 20 is a further sleeve 18, within which the pipe 12 is a sliding fit, the sleeve 18 ending at an outwardly extending flange 19 spaced from the radial wall 27.

Disposed around the pipe 12 and extending into the recess 23 on the support plate 16 is a screw-threaded element in the form of a nut 22 with an inwardly extending flange 25 at one end. The flange 25 is captively received between the radial face 27 and the flange 19, so that the nut 22 cannot move any substantial distance length-wise of the pipe 12, but can rotate therearound. The surface of the nut 22, outside the recess 23 is, for example, hexagon-shaped for engagement with a spanner to allow a user to rotate the nut 22. The nut 22 includes internal threads 24.

A fluid connection member in the form of an elbow 26, having an externally threaded portion 28, is engaged with the nut 22, thereby connecting the interior of the pipe 12 to the interior of the elbow 26. A further threaded portion 30 is provided at the free end of the elbow 26 for threaded engagement with a connector 32, which connects to a flexible pipe leading to a shower head (not shown).

Disposed between the sleeve 18 and the elbow 26 is a sealing means provided by an annular sealing member or "olive" 34. The olive 34 engages between facing annular recesses 36, 38 on the flange 19 and the threaded portion 28, respectively. The flange 19, nut 22 and the threaded portion 28, together with the olive 34 provide what is known in the art as a compression fitting.

When installing the fluid outlet assembly to a pipe 12, the pipe 12 must extend through the panel 13 and preferably protrude slightly from the tiled surface 14. The support plate 16, including the nut 22, which is engaged between the flange 19 and the radial face 27, is placed over the pipe 12 so that the sleeve 18 receives the pipe 12. The olive 34 is then placed over the pipe 12 until it abuts the flange 19. The elbow 26 is partially threaded into the nut 22 and rotated until the threaded portion 30 is pointing in a desired direction, e.g.

normally downwards for connection by connector 32 to a flexible pipe of a shower head (not shown). The nut 22 is tightened so as to collapse the olive 34 between the recesses 36, 38. The collapsed olive 34 provides a fluid-tight seal between the pipe 12 and the elbow 26, such that a fluid, e.g. hot or cold water, can pass through the pipe 12 and into the elbow 26 and not escape.

A cover member in the form of a cover plate 35, e.g. of a plastics material, is snap-fitted to the support plate 16 to conceal the assembly therebeneath.

In the above description the support plate 16 and the sleeve 18 are of a compatible metal alloy, e.g. brass, allowing them to be welded, soldered or bonded to each another, thereby fixing the sleeve 18 within the sleeve 20 of support plate 16. The pipe 12 would be of copper, whilst the nut 22 and elbow 26 are conventionally manufactured from brass. The olive 34 is also of a copper based alloy, thereby allowing it to deform more easily and hence provide an adequate seal between the sleeve 18 and the elbow 26. However, it must be understood that other materials may be used for the components of the outlet assembly as long as they have physical properties capable of being utilised in the present invention.

Figure 2:
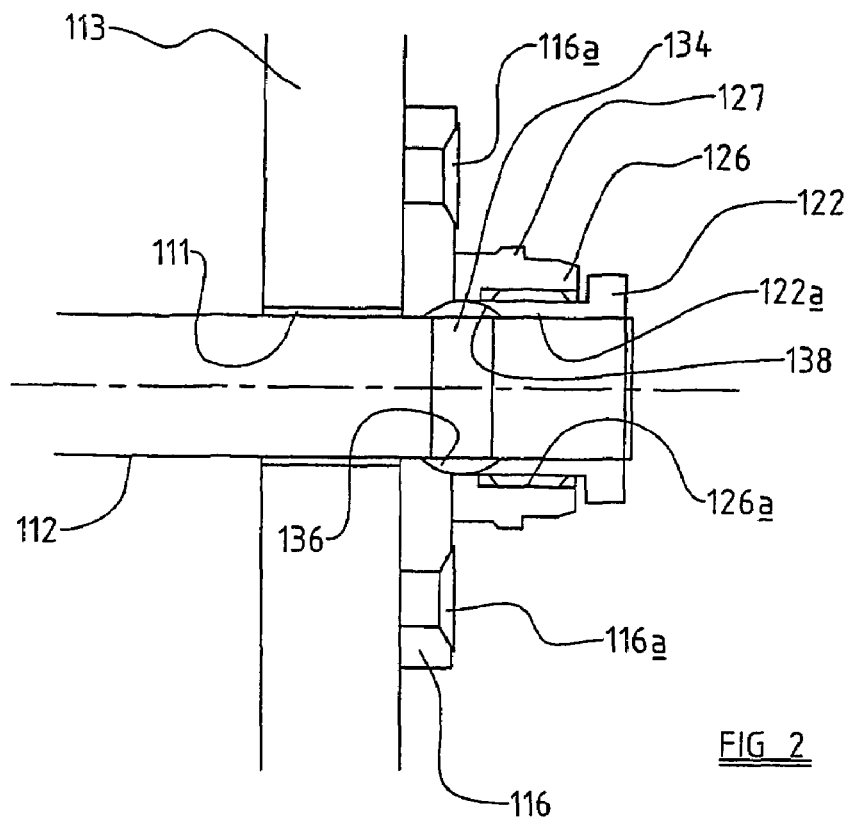
FIG. 2 is a view as FIG. 1 of a further embodiment of fluid connection assembly in accordance with the invention.

Referring now to FIG. 2 of the drawings, this shows, in a view corresponding to FIG. 1, a further embodiment of the invention. In this embodiment, a pipe 112 extends through an aperture 111 in a panel 113. At the front surface of the panel 113 there is provided a support member in the form of a support plate 116, secured to the panel 113 by screws passing through countersunk apertures 116a in the support plate. The support plate 116 has a part 126 which extends forwardly therefrom, surrounding the pipe 112 and constituting a connection member. The connection member 126 is internally screw-threaded at 126a, for engagement by a complementary external screw-thread on a sleeve part 122a of a nut 122. An olive 134 surrounds the pipe 112, and is engaged between facing annular recesses 136, 138 in the support plate 116 and sleeve part 122a, respectively, so that tightening of the nut 122 causes the olive to be compressed and establish a fluid-tight connection between the pipe 112 and the support plate 116.

The portion 126 of the support plate which forms the connection member is provided on its external surface with an annular land 127. A fitting of any desired type, e.g. a shower inlet fitting, may be fitted over the portion 126 and secured by, for example, a grub screw or screws engaging the land 127. Suitable sealing members, e.g. O-rings, may be disposed in known manner to provide a fluid-tight connection between the fitting and the portion 126.

Figure 3:
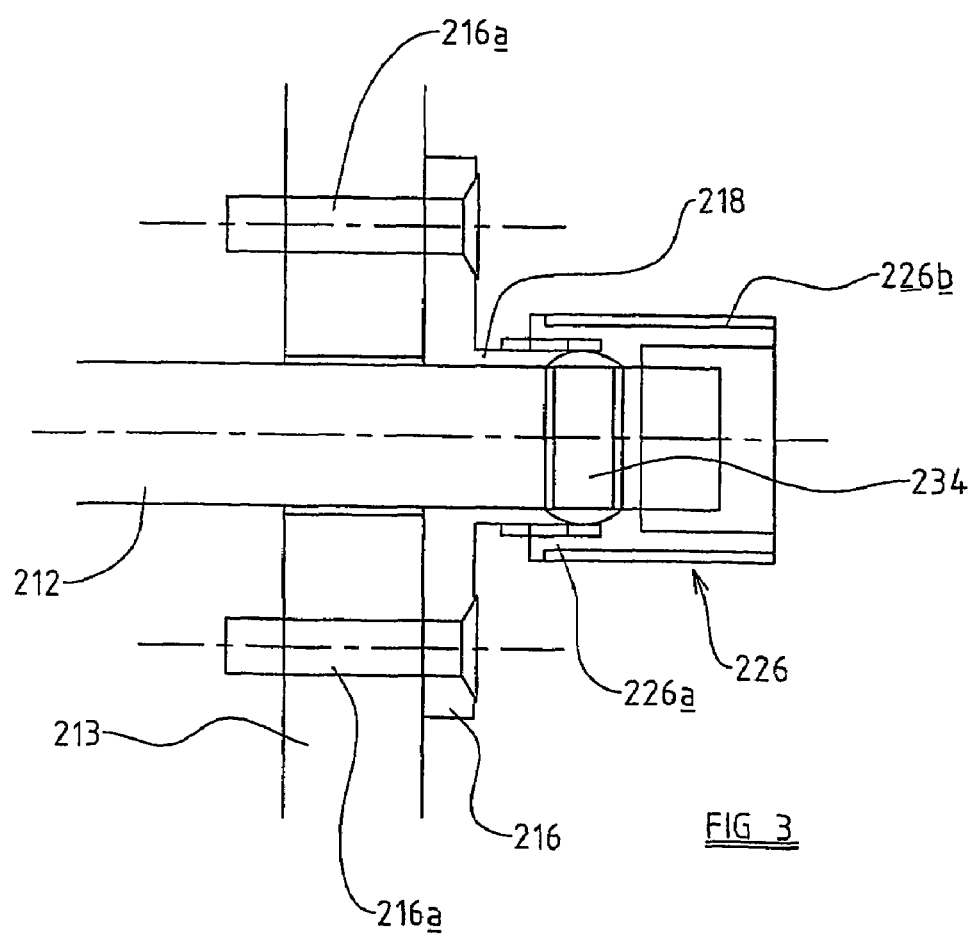
FIG. 3 is a view of a yet further embodiment of the invention.

Referring finally now to FIG. 3 of the drawings, this shows a further embodiment of the invention in which again there is a pipe 212 extending through an aperture in a panel 213. There is also a support plate 216 secured to the front surface of the panel 213 by screws shown at 216a. The support plate 216 has a forwardly extending externally screw-threaded spigot portion 218 which closely surrounds the pipe 212.

Engaged with the screw-thread on the exterior of the spigot portion 218 there is a correspondingly internally screw-threaded end portion 226a of a connection member 226. An olive 234 is received between annular recesses in the end of the spigot portion 218 and in the interior of the connection member 226, and is deformed into engagement with the pipe and other components by tightening the screw-threaded connection between the connection member 226 and the spigot portion 218. Thus a fluid-tight connection is provided between the connection member 226 and the pipe 212.

The connection member 226 is externally screw-threaded at 226b, for engagement by a fitting such as a shower head for example. A flat seal may be disposed between such a fitting and the free end of the connection member 226.

It will be appreciated that in all the embodiments of the invention above described a fluid tight connection is achieved between the connection member and the fluid supply pipe without requiring any access to the rear of the panel through which the pipe extends. This considerably simplifies the installation of showers, for example, utilising such assemblies.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A fluid connection assembly for establishing a connection with a fluid supply pipe extending from a rear face of a panel to a front face of the panel, the assembly comprising;
   a fluid conduit including an interior passage engageable with the fluid supply pipe and a threaded portion;
   a support member receivable onto the fluid supply pipe and into an opening through the panel, the support member including a recess ending in a face followed by a sleeve with an opening for receiving the fluid supply pipe;
   a rotatable sleeve receivable onto the fluid supply pipe and through the opening in the support member, the rotatable sleeve including a flange;
   a threaded member supported between the flange of the rotatable sleeve and the face of the support member, the threaded member rotatable relative to the support member for engaging the threaded portion of the fluid conduit; and
   a sealing element deformable in response to tightening of the threaded member onto the threaded portion of the fluid conduit to establish a seal between the fluid supply pipe and the fluid conduit;
   wherein the sealing element is disposed about the fluid supply pipe between the rotatable sleeve on a first axial end and the fluid conduit.

2. The fluid connection assembly according to claim 1, wherein the support member comprises a plate portion abutting the front face of the panel and the recess comprises a cylindrical recess that extends past the front face of the panel toward the rear face of the panel.

3. The fluid connection assembly according to claim 2, wherein the flange of the rotatable sleeve holds the threaded member in a desired axial position relative to the support plate while providing for rotation of the threaded member relative to the support plate.

4. The fluid connection assembly according to claim 3, wherein the threaded member comprises a threaded nut including an inwardly extending flange corresponding to the flange of the rotatable sleeve for holding the desired axial position of the threaded member onto the support.

5. The fluid connection assembly according to claim 1, wherein the fluid conduit comprises an elbow having external threads on each end.

6. The fluid connection assembly according to claim 1, wherein the fluid conduit is adapted to have a shower head or hose connected to it.

7. The fluid connection assembly according to claim 1, including a cover member, adapted to engage with the assembly and to conceal the assembly.

8. A fluid connection assembly for establishing fluid communication with a fluid supply pipe extending through an opening in a fixed panel, the fluid connection assembly comprising:
- a support attachable to the panel, wherein the support includes a recess receivable within an opening for the fluid supply pipe and a plate extending radially outward from the recess;
- a threaded member supported on the support and rotatable relative to the support;
- a conduit including a threaded portion engageable with the threaded member for establishing fluid communication with the fluid supply pipe;
- a seal that is compressible in response to the threaded portion of the conduit being threadably engaged by the threaded member; and
- a sleeve disposed between the fluid supply pipe and the opening in the support for rotatably supporting the threaded member;
- wherein the seal is disposed around the fluid supply pipe and between the sleeve and the conduit.

9. The fluid connection assembly as recited in claim 8, wherein the support includes a face portion that abuts the panel and the recess comprises a cylindrical portion that extends through the panel about the fluid supply pipe.

10. The fluid connection assembly as recited in claim 9, wherein the face portion is attachable to the panel.

* * * * *